United States Patent   (10) Patent No.:   US 11,340,145 B2
Janhunen et al.                (45) Date of Patent:        May 24, 2022

(54) APPARATUS FOR COLLECTING DUST SAMPLES

(71) Applicant: VALMET AUTOMATION OY, Espoo (FI)

(72) Inventors: Petri Janhunen, Espoo (FI); Ilkka Pyykkönen, Espoo (FI); Pasi Kärki, Espoo (FI); Timo Sirviö, Espoo (FI)

(73) Assignee: VALMET AUTOMATION OY, Espoo (FI)

( * ) Notice: Subject to any disclaimer, the term of this patent is extended or adjusted under 35 U.S.C. 154(b) by 0 days.

(21) Appl. No.: 17/318,266

(22) Filed: May 12, 2021

(65) Prior Publication Data

US 2021/0364396 A1    Nov. 25, 2021

(30) Foreign Application Priority Data

May 19, 2020  (FI) .................................. 20205505

(51) Int. Cl.
*G01N 1/14* (2006.01)
*G01N 1/20* (2006.01)
*G01N 1/10* (2006.01)

(52) U.S. Cl.
CPC ................ *G01N 1/14* (2013.01); *G01N 1/20* (2013.01); *G01N 2001/1006* (2013.01); *G01N 2001/1427* (2013.01); *G01N 2001/2057* (2013.01)

(58) Field of Classification Search
CPC .... G01N 1/14; G01N 1/20; G01N 2001/1006; G01N 2001/1427; G01N 2001/2057; G01N 1/2035; G01N 1/2247; G01N 1/2258
USPC ............................. 73/863.41, 863.51, 863.54
See application file for complete search history.

(56) References Cited

U.S. PATENT DOCUMENTS

| 3,659,461 | A | * | 5/1972 | Thompson | G01N 1/2035 |
| | | | | | 73/863.54 |
| 4,002,071 | A | * | 1/1977 | Collins | G01N 1/125 |
| | | | | | 73/864.56 |
| 4,024,765 | A | * | 5/1977 | Abonnenc | G01N 1/20 |
| | | | | | 73/863.83 |
| 4,269,064 | A | * | 5/1981 | Johnson | G01N 1/2035 |
| | | | | | 73/863.82 |

(Continued)

FOREIGN PATENT DOCUMENTS

CH           504679 A        3/1971

OTHER PUBLICATIONS

Nov. 4, 2020 Search Report issued in Finnish Patent Application No. 20205505.

*Primary Examiner* — Nimeshkumar D Patel
*Assistant Examiner* — Nashmiya S Fayyaz
(74) *Attorney, Agent, or Firm* — Oliff PLC

(57) ABSTRACT

The invention relates to an apparatus (100) for collecting dust samples. The apparatus comprises a piston (102) and a cylinder (110) for holding the piston with a body having a hole (108) extending through the body. The cylinder (110) has a first end (112), which is open, the first end of the cylinder being slanted such that underside (130) of the cylinder extends farther than upper side (132). A mechanism (114) moves the piston between inward and outward positions. The apparatus gathers dust flowing past the piston into the hole of the piston when the piston is in the outward position and moves the gathered dust by moving the piston into the inward position. An input feed (116) is configured to spread fluid through the hole filled with dust to flush the dust to an output feed (118).

15 Claims, 3 Drawing Sheets

(56) References Cited

U.S. PATENT DOCUMENTS

| | | | |
|---|---|---|---|
| 4,635,470 A * | 1/1987 | Skallen | G01N 15/08 162/263 |
| 6,055,870 A | 5/2000 | Jaeger | |
| 2011/0314900 A1 | 12/2011 | Blacklin et al. | |

* cited by examiner

APPARATUS FOR COLLECTING DUST SAMPLES

TECHNICAL FIELD

The exemplary and non-limiting embodiments of the invention relate generally to collecting dust samples.

BACKGROUND

Automation systems are widely used in measuring and controlling various industrial processes such as paper and pulp or chemical factories. In many processes dust is produced in some form and analysing the amount and properties of the dust is important when monitoring and controlling the process. An example of such process is pulp processing in recovery boilers. Recovery boilers may comprise electric filters that may gather dust or ash from boilers. Analysing the dust at the output of electric filters is technically difficult to realise in a reliable manner. In many cases the dust is conveyed in pipes where there is a negative pressure. Prior art solutions of collecting dust samples have typically a screw-type structure or utilise pressured air to blow dust into a container. They process dry dust and need constant monitoring and cleaning as the dust get cloddy and blocks the dust collectors, especially when the dust is lime based. Similar applications can be found, for example, in food processing, where milk powder, coffee powder, and flour manufacturing processes need similar monitoring and controlling.

BRIEF DESCRIPTION

An object of the invention is to provide an improved method and an apparatus implementing the method to reduce or avoid the above-mentioned problems.

The objects of the invention are achieved by an apparatus for collecting dust samples, comprising a piston and a cylinder structure for holding the piston; the piston with a body having an inner end and an outer end, the inner end being always inside the cylinder structure, the piston comprising a hole in the longitudinal side of the body, the hole extending through the body in a direction perpendicular to a movement of the piston; the cylinder structure having a first end, which is open, the first end of the cylinder being slanted such that underside of the cylinder extends farther than upper side, the outer end of the piston being substantially level with or extending farther than the underside of the first end of the cylinder when the piston is in an inward position; a mechanism configured to move the piston between the inward position and an outward position; the cylinder comprising an input feed at the upper side wall of the cylinder, and an output feed at the underside wall of the cylinder, the input and the output feeds being on the opposite sides of the cylinder wall, the hole being outside the upper side of the first end of the cylinder and the underside of the hole being inside the underside of the first end of the cylinder when the piston is in the outward position, the hole and the underside of the cylinder forming a space open at upper side but closed at the bottom for gathering dust flowing past the piston; the hole of the piston being between the input and output feeds when the piston is in the inward position; the input feed being connected to a fluid line for spreading fluid through the hole filled with dust to flush the dust to the output feed when the piston is in the inward position.

The objects of the invention are achieved by a method of collecting dust samples from a conduit in which dust is flowing, the method comprising: controlling movement of a piston inside a cylinder structure for holding the piston; the piston with a body having an inner end and an outer end, the inner end being always inside the cylinder structure, the piston comprising a hole in the longitudinal side of the body, the hole extending through the body in a direction perpendicular to a movement of the piston; the cylinder structure having a first end, which is open, the first end of the cylinder being slanted such that underside of the cylinder extends farther than upper side, the outer end of the piston being substantially level with or extending farther than with the underside of the first end of the cylinder when the piston is in an inward position, the first end being inside the conduit; moving the piston to an outward position to gather dust flowing in the conduit into the hole of the piston, the hole being outside the upper side of the first end of the cylinder and the underside of the hole being inside the underside of the first end of the cylinder, the hole and the underside of the cylinder forming a space open at upper side but closed at the bottom; moving the piston to the inward position where the hole of the piston is between an input feed at the upper side wall of the cylinder, and an output feed at the underside wall of the cylinder, the feeds being on the opposite sides of the cylinder wall; flushing the dust from the hole to the output feed with an amount of fluid from the input feed.

Some embodiments of the invention are disclosed in the dependent claims.

One or more examples of implementations are set forth in more detail in the accompanying drawings and the description below. Other features will be apparent from the description and drawings, and from the claims.

The embodiments and features described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

The solution according to the invention is suitable for sampling any kind of flowing dust. In an embodiment, the dust is flowing in a pipe or conduit where there may be a negative pressure. The apparatus is attachable to a conduit or pipe in a simple manner. In an embodiment, a simple hole may be drilled into the pipe wall and the apparatus can be installed into the hole.

Collecting dust samples from conduits is problematic as dust has a tendency to cumulate into dust collector and block the operation of the collector.

Figure 1A:
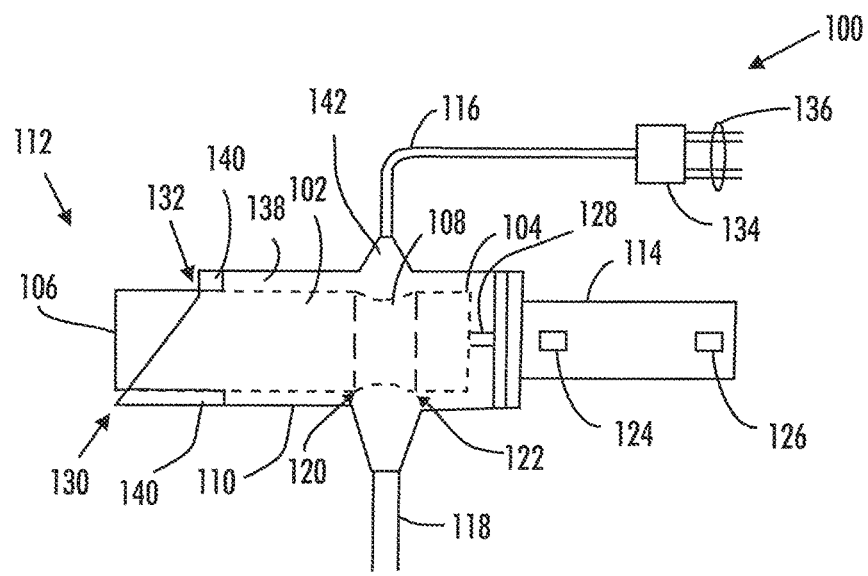
FIGS. 1A, 1B and 2 illustrate examples of an apparatus.
Figure 1B:
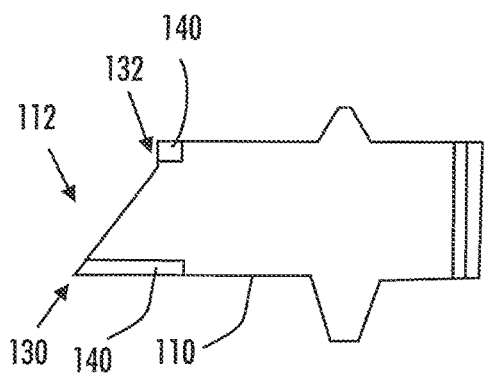
Figure 2:
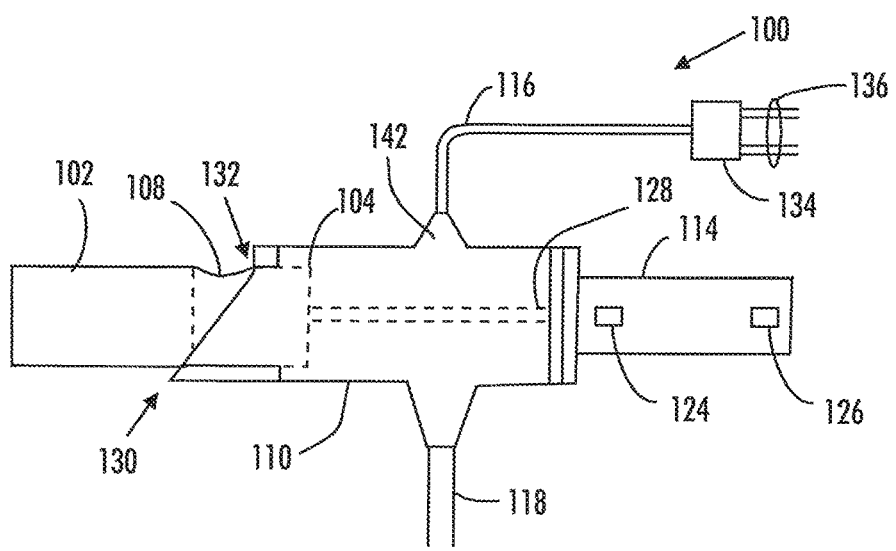

FIGS. 1A, 1B, and 2 illustrate examples of an apparatus 100. The apparatus 100 for collecting dust samples comprises a piston 102 and a cylinder structure or a piston chamber 110 for holding the piston. The piston is configured to move inside the cylinder structure between an inward position and an outward position. FIG. 1A illustrates the apparatus when the piston 102 is in the inward position. FIG.

1B illustrates an example of the cylinder structure without the piston. FIG. 2 illustrates the apparatus when the piston 102 is in the outward position.

The piston 102 comprises a body having an inner end 104 and an outer end 106. The inner end of the piston is always inside the cylinder structure.

In an embodiment, the piston comprises a hole 108 in the longitudinal side of the body, the hole extending through the body in a direction perpendicular to a movement of the piston. In an embodiment, the cross section of the hole is circular or elliptical. However, the cross section may also have any other shape.

In an embodiment, the cylinder structure 110 has a first end 112, which is open. The first end of the cylinder may be slanted such that underside 130 of the cylinder extends farther than upper side 132. The outer end 106 of the piston is substantially level with or extending farther than the underside of the first end of the cylinder when the piston is in an inward position.

The apparatus may comprise a mechanism 114 configured to move the piston between the inward position and an outward position. In an embodiment, the mechanism utilises compressed air to move the piston.

The apparatus may comprise detectors 124, 126 for detecting when the piston is in the inward position and in the outward position. In an embodiment, the piston is attached to a shaft 128. The detectors may detect the movement or position of the shaft.

In an embodiment, the cylinder structure comprises an input feed 116 at the upper side wall of the cylinder structure and an output feed 118 at the underside wall of the cylinder structure. The input and the output feeds may be on the opposite sides of the cylinder wall. In an embodiment, the feeds are at substantially the same distance from the upper end 132 of the first end 112 of the cylinder.

In an embodiment, the cylinder structure has a larger diameter than the piston and there is an open space 138 formed around the piston inside the cylinder structure up till the first end 112 of the cylinder structure. In an embodiment, the difference between the diameter of the cylinder structure and the diameter of the piston is between millimetres to tens of millimetres. At the first end 112 of the cylinder structure, the cylinder structure has a section 140 having a diameter corresponding to the diameter of the piston. The section and the piston seals hermetically the open space 138 around the piston and the hole 108 inside the cylinder structure from outside.

In an embodiment, the length of the section 140 is substantially shorter than the length of the whole structure. In an embodiment, the cylinder structure is made of a single piece of material. It may also be manufactured of multiple components.

In an embodiment, the apparatus comprises a connector 134 connecting input feed to a fluid line 136 configured to feed fluid through the hole filled with dust to the output feed.

In an embodiment, when the piston is in the inward position illustrated in FIG. 1A, the hole of the piston is between the input and output feeds of the cylinder structure.

When the piston is in the outward position as illustrated in FIG. 2, the hole of the piston is outside the upper side 132 of the first end of the cylinder and the underside of the hole is inside the underside of the cylinder structure. Thus, the hole and the underside of the cylinder form a space open at upper side but closed at the bottom.

Figure 3A:
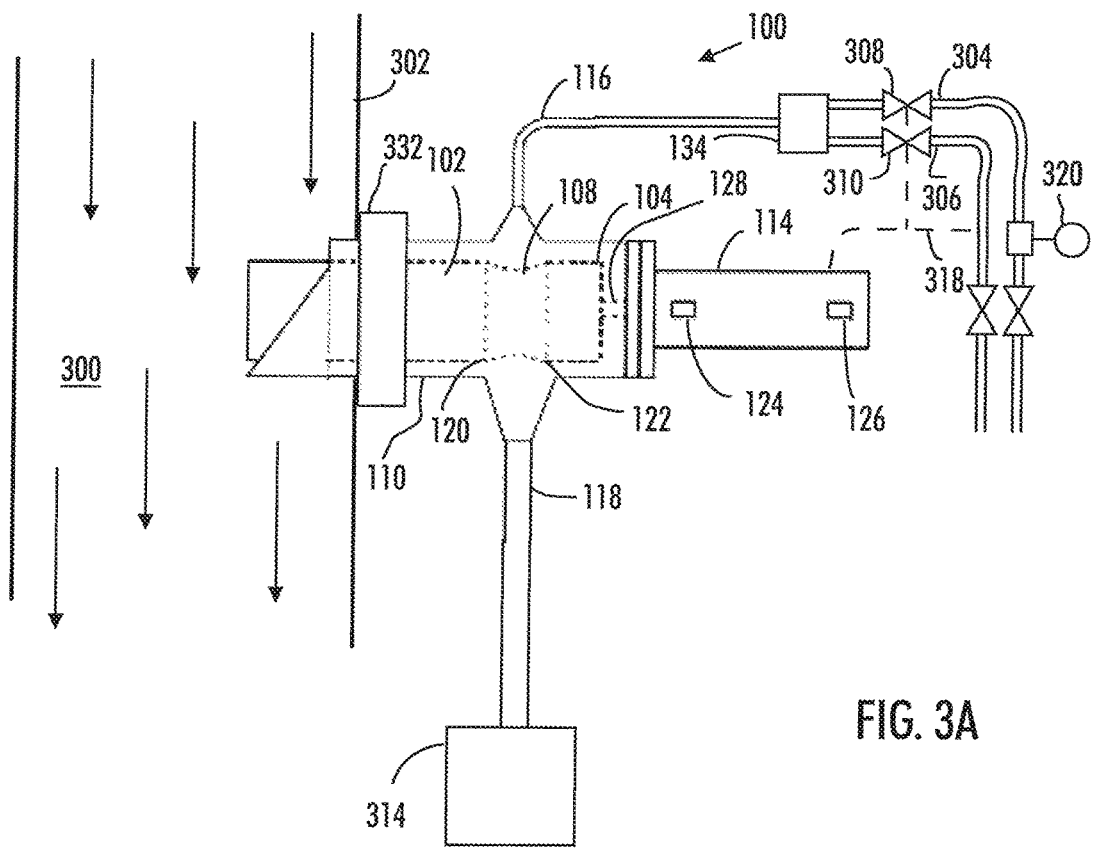
FIGS. 3A and 3B illustrate examples of the apparatus when installed on a conduit or pipe where dust is flowing.
Figure 3B:
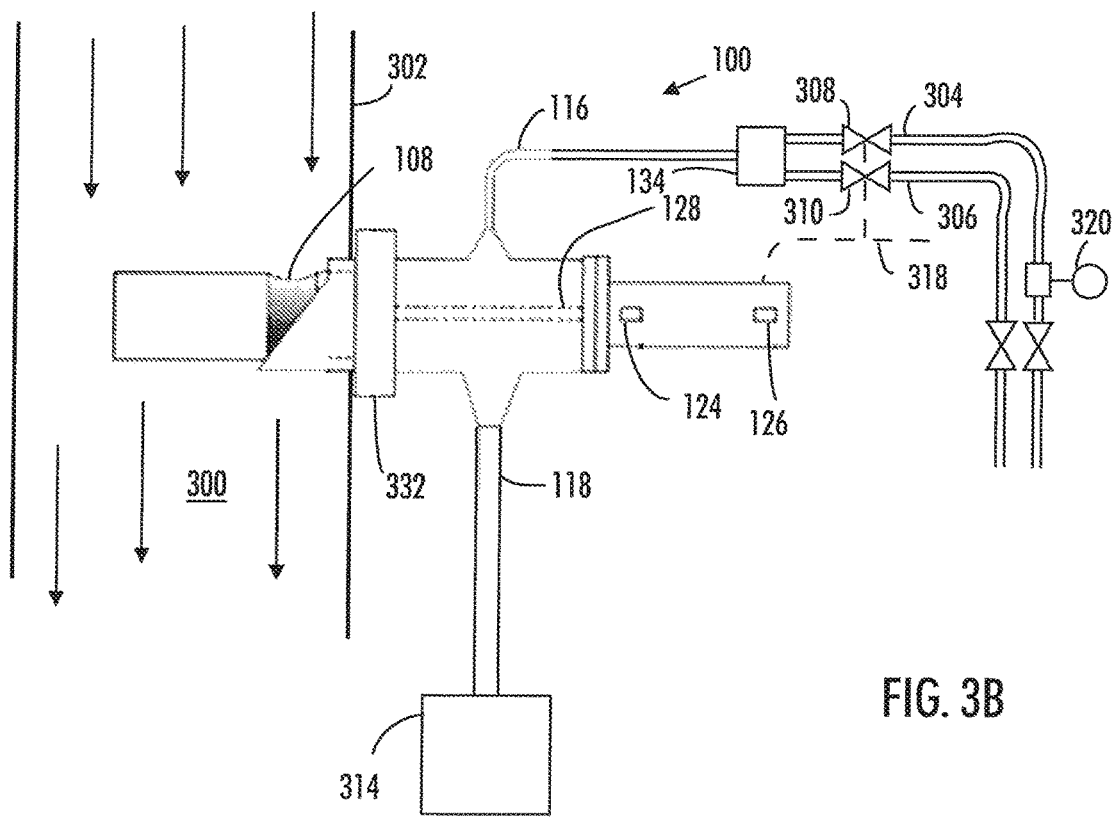

FIGS. 3A and 3B illustrate examples of the apparatus 100 connected to a conduit or pipe 300 where dust or ash is flowing. The apparatus 100 may be installed to a wall 302 of the conduit or pipe 300 by preparing a suitable hole in the wall 302 and fixing the apparatus to the hole, for example with a flange 332. In this example, the dust is flowing downwards inside the conduit or pipe 300. In an embodiment, the conduit or pipe has a negative pressure.

FIG. 3A illustrates a situation where the apparatus is installed and when the piston 102 is in the inward position. FIG. 3B illustrates a situation where the apparatus is installed and when the piston 102 is in the outward position.

In the examples of FIGS. 3A and 3B the input feed 116 at the upper side wall of the cylinder structure is connected to fluid supplies 304, 306 via valves 308, 310 and connector 134. Further, the output feed 118 at the underside wall of the cylinder structure is connected to sample analyser cavity 314. In an embodiment, the fluid supplies 304, 306 are water and gas supplies. The gas may be air or some other gas. In an embodiment, the amount of gas and water is adjusted and regulated for constant flow. In an embodiment, the water pressure may be is monitored with a pressure sensor 320 to detect pressure loss and sample line blockages.

In an embodiment, the apparatus is configured to receive one or more control signals 318 controlling the movements of the piston and valves 308, 310 feeding of fluid to input feed 116.

As mentioned, in an embodiment, the piston 102 and the section 140 at the open end of the cylinder structure are configured to hermitically seal the conduit from the hole 108 and the open space 138 around the piston from each other while the piston is in the inward position.

As mentioned, the outer end 106 of the piston is substantially level with or extending farther than the underside 130 of the first end of the cylinder structure when the piston is in the inward position. Also this protects the cylinder structure from the dust flowing in the conduit. The dust may not enter the cylinder structure and cause blockages possibly disturbing the piston movement.

Figure 4:
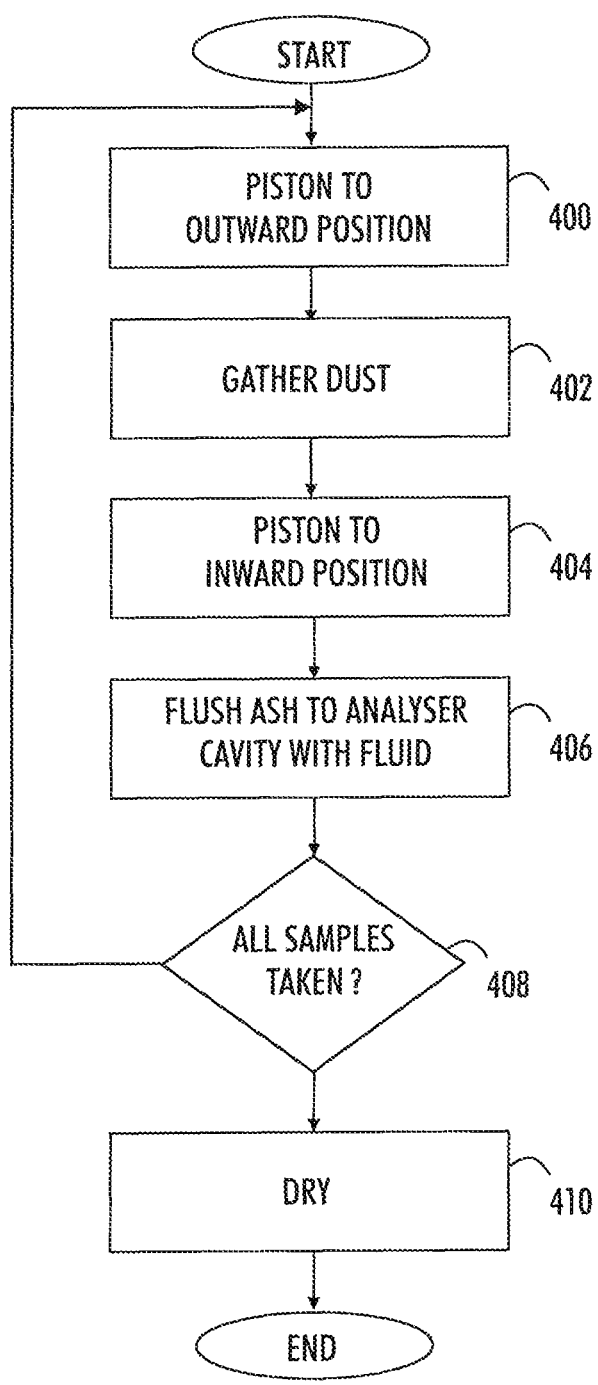
FIG. 4 is a flowchart illustrating an example of an embodiment.

FIG. 4 is a flowchart illustrating the operation of collecting a sample of dust flowing in the conduit or pipe 300 with the apparatus 100. In the beginning of the process, the piston 102 is in the inward position as illustrated in FIG. 3A, valves 308, 310 and the output valve 312 are closed. The outer end of the piston 102 is substantially level with the underside of the first end of the cylinder when the piston is in the inward position.

In step 400, the piston is moved to outward position to gather dust. The situation is as illustrated in FIG. 3B. When the piston is in the outward position, the hole 108 of the piston is outside the upper side of the first end of the cylinder and the underside of the hole is inside the underside of the first end of the cylinder structure. In an embodiment, the edges 120, 122 of the hole in the piston may scrape the inside surface of cylinder clean of dust when the piston moves between the inward position and the outward position. In an embodiment, edges of the section 140 scrape the piston clean of dust when the piston moves between the inward position and the outward position.

In step 402, dust moving in the conduit or pipe 300 gathers in the space formed by the hole and the underside of the cylinder structure.

In an embodiment, the piston stays in the outward position for a predetermined time.

In step 404, the piston is moved to the inward position. This way the dust gathered in the space formed by the hole in the piston and the underside of the cylinder structure is moved from the conduit or pipe 300 inside the apparatus between the input and output feeds 116, 118.

Again, as the piston moves to the inward position, the edges 120, 122 of the hole in the piston scrape the inside surface of cylinder clean of dust when the piston moves from the inward position to the outward position.

In step 406, the valves 308, 310 are opened. Thus, fluid coming from the fluid supplies 304, 306 via the connector 134 and the input feed 116 flush the dust from the hole 108 to the sample analyser cavity 314 via the output feed 118. The fluid flushes also the open space 138 around the piston. In an embodiment, the input feed comprises a nozzle to spray the fluid into the open space around the piston to flush dust from the open space into the output feed. It may be noted here that the piston 102 and the section 140 at the open end of the cylinder structure seal the open space from the conduit. Thus, fluid from the input feed does not enter the conduit but is limited to the open space and the hole. The cavity receives thus the dust fluid. In an embodiment, the fluid is a mixture of water and air or some other gas. After a given amount of fluid is flushed the valves 308, 310 are closed. The amount of fluid may be a system parameter. Flushing the space 138 around the piston and the hole with the fluid effectively cleans the open space and the hole of any dust. Thus, the dust will not dust get cloddy and block the apparatus. This lengthens the time the apparatus may be used without any maintenance such as additional cleaning.

In an embodiment, the three above steps are performed a given number of times. Thus, dust samples may be gathered for example three times into the sample analyser cavity 314 before sample analysis is performed. In this way, a suitable amount of dust and fluid may be gathered.

In step 408, it is checked whether a given number of samples have been gathered. If not, the process continues in step 400.

It may be noted that the length of the output feed 118 connecting the apparatus to the sample analyser cavity 314 is not limited to any given length. As the fluid flushes the dust into the output feed, the fluid may travel along the feed to the sample analyser cavity several metres or tens or hundreds of meters, for example.

In step 410, one or both of the valves 308, 310 are opened and the hole and the open space around the piston is dried. In an embodiment, the drying is performed with the same fluid as in step 406. In an embodiment, the cleaning is performed with gas only. The gas may be air, or it may also be some other gas.

In an embodiment, where the hole and the open space around the piston are dried using air or some other gas, the air or other gas may enter the sample analyser cavity at the end of the output feed but it may leak out from the cavity and not disturbing the sample.

The collected sample of dust and fluid may then be analysed in the sample analyser cavity 314 or the collected sample of dust and fluid may be taken elsewhere for analysis.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for collecting dust samples, comprising a piston and a cylinder structure for holding the piston; the
 piston comprising a body having an inner end and an outer end, the inner end being always inside the cylinder structure, the piston comprising a hole in the longitudinal side of the body, the hole extending through the body in a direction perpendicular to a movement of the piston;
 the cylinder structure having a first end, which is open, the first end of the cylinder being slanted such that underside of the cylinder extends farther than upper side, the outer end of the piston being substantially level with or extending farther than the underside of the first end of the cylinder when the piston is in an inward position;
 a mechanism configured to move the piston between the inward position and an outward position;
 the cylinder comprising an input feed at the upper side wall of the cylinder, and an output feed at the underside wall of the cylinder, the input and the output feeds being on the opposite sides of the cylinder wall,
 the hole being outside the upper side of the first end of the cylinder and all of the underside of the hole being inside the underside of the first end of the cylinder when the piston is in the outward position, the hole and the underside of the cylinder forming a space open at the upper side but fully closed at the bottom for gathering dust flowing past the piston in the outward position;
 the hole of the piston being between the input and output feeds when the piston is in the inward position;
 the input feed being connected to a fluid line for spreading fluid through the hole filled with dust to flush the dust to the output feed when the piston is in the inward position.

2. The apparatus as claimed in claim 1, wherein the cylinder structure has a larger diameter than the piston and there is an open space formed around the piston inside the cylinder structure up till the first end of the cylinder structure, the first end of the cylinder structure having a section with a diameter corresponding to the diameter of the piston and hermetically sealing the open space around the piston inside the cylinder structure from outside.

3. The apparatus as claimed in claim 2, wherein the input feed comprises a nozzle to spray the fluid into the open space around the piston to flush dust into the output feed.

4. The apparatus as claimed in claim 1, the hole in the piston comprising edges configured to scrape the inside surface of cylinder clean of dust when the piston moves between the inward position and the outward position.

5. The apparatus as claimed in claim 1, wherein the apparatus is configured to
 move the piston to outward position to gather dust,
 move the piston to inward position;
 flush the dust from the hole to a sample analyser cavity with an amount of fluid from the input feed,
 perform the three above steps a given number of times.

6. The apparatus as claimed in claim 5, wherein the apparatus is configured, when the piston is in the inward position, to
 clean the hole and open space formed around the piston inside the cylinder structure with an amount of gas or fluid from the input feed.

7. The apparatus as claimed in claim 1, wherein the fluid is a mixture of water and gas.

8. A method of collecting dust samples from a conduit in which dust is flowing, the method comprising:
 controlling movement of a piston inside a cylinder structure for holding the piston; the piston comprising a body having an inner end and an outer end, the inner end being always inside the cylinder structure, the piston comprising a hole in the longitudinal side of the body, the hole extending through the body in a direction perpendicular to a movement of the piston;

the cylinder structure having a first end, which is open, the first end of the cylinder being slanted such that underside of the cylinder extends farther than upper side, the outer end of the piston being substantially level with or extending farther than with the underside of the first end of the cylinder when the piston is in an inward position, the first end being inside the conduit;

moving the piston to an outward position to gather dust flowing in the conduit into the hole of the piston, the hole being outside the upper side of the first end of the cylinder and all of the underside of the hole being inside the underside of the first end of the cylinder, the hole and the underside of the cylinder forming a space open at the upper side but fully closed at the bottom in the outward position;

moving the piston to the inward position where the hole of the piston is between an input feed at the upper side wall of the cylinder, and an output feed at the underside wall of the cylinder, the feeds being on the opposite sides of the cylinder wall;

flushing the dust from the hole to the output feed with an amount of fluid from the input feed.

9. The method as claimed in claim 8, further comprising: spraying the fluid into an open space around the piston inside the cylinder structure to flush dust into the output feed, the open space being formed by the cylinder structure having a larger diameter than the piston up till the first end of the cylinder structure, the first end of the cylinder structure having a section with a diameter corresponding to the diameter of the piston and hermetically sealing the open space around the piston inside the cylinder structure.

10. The method as claimed claim 8, further comprising: receiving one or more control signals controlling the movements of the piston and the feeding of the fluid.

11. The method as claimed claim 8, further comprising: scraping the surface of the piston clean of dust with edges of a section of the cylinder structure when the piston moves between the inward position and the outward position.

12. The method as claimed claim 8, further comprising:

cleaning the hole and open space formed around the piston inside the cylinder structure with an amount of gas or fluid from the input feed.

13. The method as claimed claim 8, wherein the conduit has a negative pressure.

14. The apparatus as claimed in claim 1, wherein the first end of the cylinder is configured to extend into a conduit in which the dust is flowing when the piston is in the inward position.

15. The method as claimed in claim 8, wherein the first end of the cylinder extends into the conduit when the piston is in the inward position.

* * * * *